G. BETTS & E. C. COREY.
FOLDING STAND FOR MOTOR CYCLES.
APPLICATION FILED SEPT. 12, 1916.
1,254,624.
Patented Jan. 22, 1918.
2 SHEETS—SHEET 2.
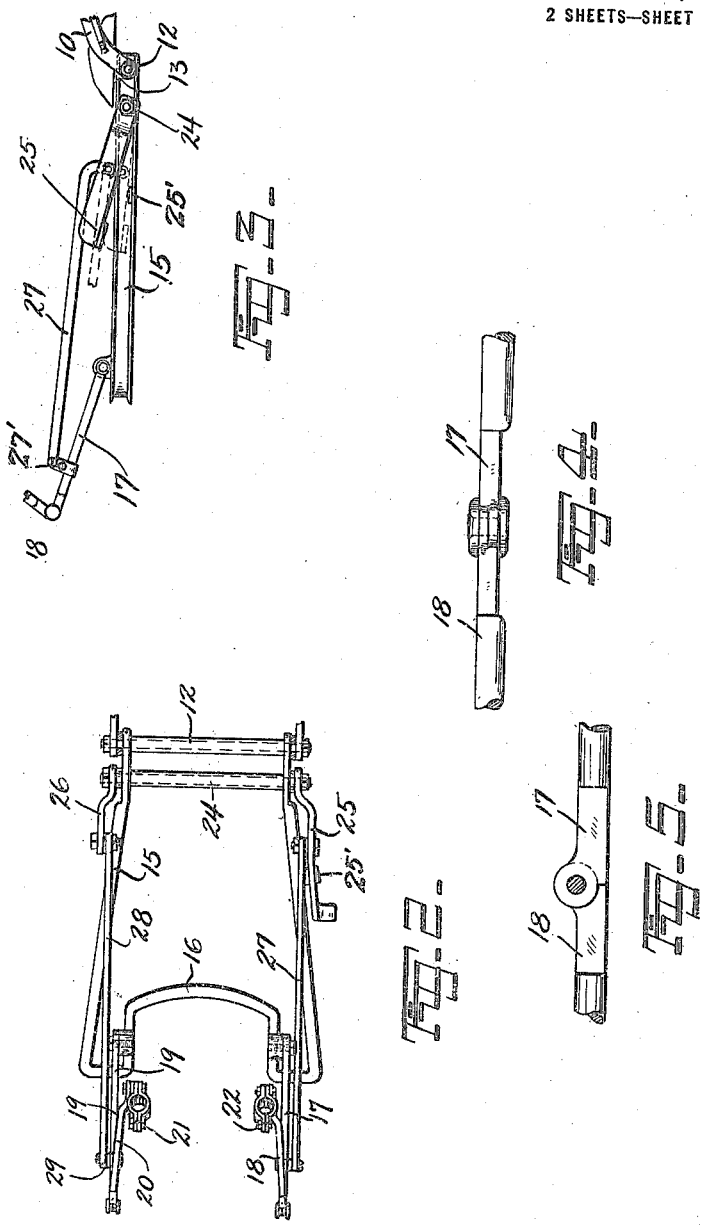
INVENTORS
GEORGE BETTS
EARL C. COREY
BY
Carlos P. Griffin
ATTORNEY.

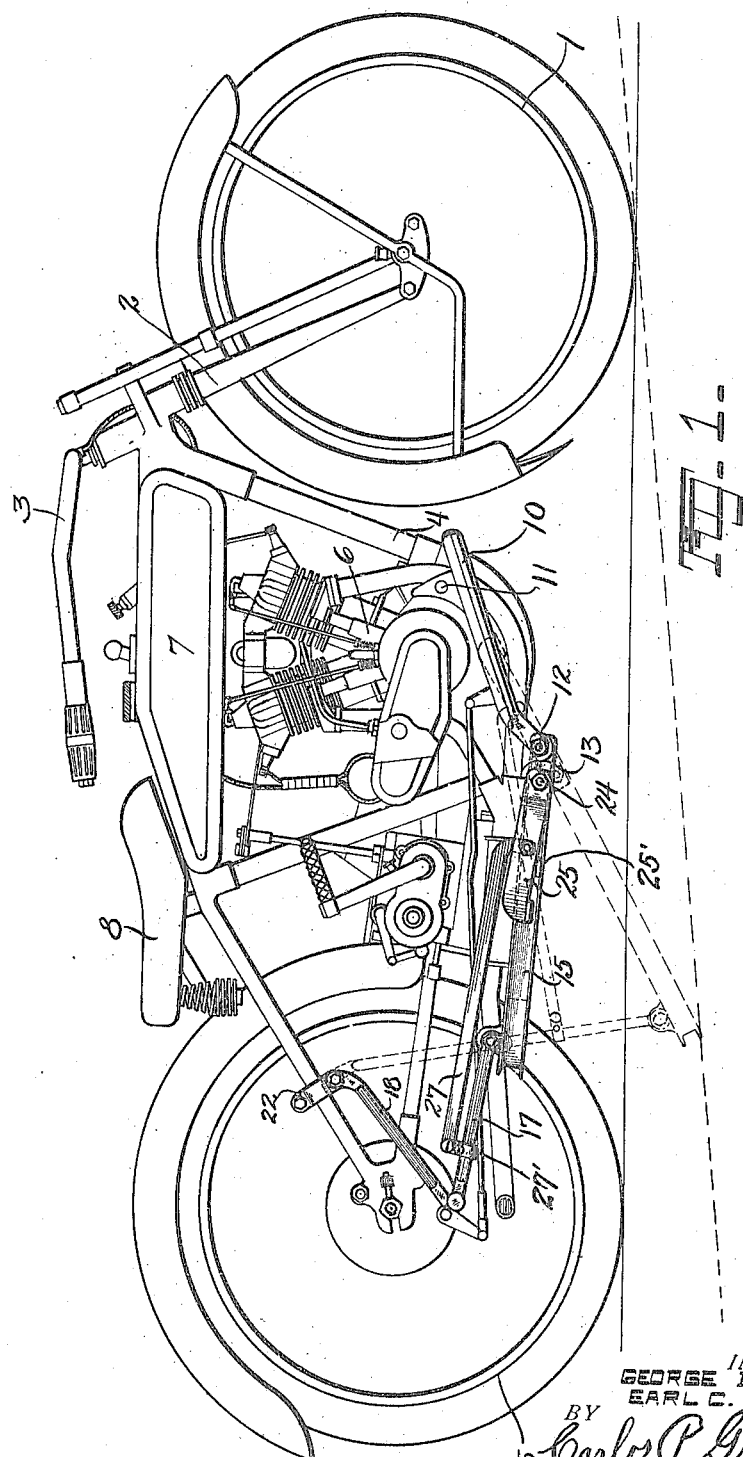

UNITED STATES PATENT OFFICE.

GEORGE BETTS AND EARL C. COREY, OF RICHMOND, CALIFORNIA, ASSIGNORS, BY DIRECT AND MESNE ASSIGNMENTS, OF SIXTY-FIVE ONE-HUNDREDTHS TO SAID BETTS, FIFTEEN ONE-HUNDREDTHS TO JAS. P. ARNOLD, AND TWENTY ONE-HUNDREDTHS TO JOSEPH I. BROOKS, ALL OF RICHMOND, CALIFORNIA.

FOLDING STAND FOR MOTOR-CYCLES.

1,254,624.     Specification of Letters Patent.     Patented Jan. 22, 1918.

Application filed September 12, 1916. Serial No. 119,641.

*To all whom it may concern:*

Be it known that we, GEORGE BETTS and EARL C. COREY, citizens of the United States, residing at Richmond, in the county of Contra Costa, State of California, have invented a new and useful Folding Stand for Motor-Cycles, of which the following is a specification in such full and clear terms as will enable those skilled in the art to construct and use the same.

This invention relates to a folding stand for motorcycles having means connected therewith to enable the rider to lift the machine with a foot lever.

It will be understood by those skilled in the art that it is necessary to provide means to support the motorcycle when a stop is made or when it is desired to change a tire or do any work on the machine.

Another object of the invention is to locate the support in a position such that it will not increase the height of the center of gravity of the machine and to provide an exceedingly stable support when in use.

Other objects of the invention will appear as the description proceeds.

An embodiment of the invention is shown in the drawings in which the same reference numeral is applied to the same portion throughout, but we are aware that there may be many modifications thereof.

Figure 1 is a side elevation of a motorcycle having this invention applied thereto, Fig. 2 is a plan view of the support and attached levers, Fig. 3 is a side elevation of the support with the foot lever just about to pass downwardly to the locked position, and Figs. 4 and 5 are detail views of the hinge used on one of the supporting links.

The numeral 1 indicates the front wheel of the motorcycle, 2 the steering fork, 3 the steering handle bars, 4 the main frame of the machine and 5 the rear wheel.

The engine is shown at 6 and has suitable controls and connections with the rear wheel whereby the machine may be operated. The gasolene tank is shown at 7, the saddle for the rider at 8 and the starting crank at 9. Just below the engine and at each side of the machine there is a foot board, only one being shown, 10, which boards are connected to the frame of the machine by a bolt 11 at the front and by a long bolt 12 at the back, said bolt also passing through a lug 13 extending below the frame. All of the foregoing parts are well known in the art and may be of any known type.

This support comprises a U-shaped frame 15, the U having an indentation therein at 16 to receive the rear wheel. The two free ends of the frame are connected to the machine by the bolt 12, while the rear end of said support is held up by four jointed links 17, 18, 19 and 20. The links 17 to 20 are jointed together as shown in Figs. 4 and 5 in the manner of the well known buggy top links which lock by passing over the line of their pivot points, see Figs. 4 and 5.

The links 18 and 20 are connected to the frame of the machine by means of the two pairs of clamps 21 and 22 and to which said links are pivotally connected. The links 17 and 19 are pivotally connected at their lower ends to the support 15.

Just at the rear of the bolt 12 a shaft 24 extends across the support and it has a foot lever 25 at one side and the link operating lever 26 at the other end rigidly connected thereto. The lever 25 has a link 27 connecting it with a clamp 27' of the link 17 and the lever 26 is similarly connected with a clamp 29 on the link 19 by means of the link 28.

In order to lock the frame 15 in the raised position, the said frame has a stop 25' against which the lever 25 strikes when pushed down from the position shown in Fig. 3.

The operation of the support, which is constructed of suitable metal parts, is as follows: When the machine is in use the rider presses down on the foot pedal 25 after lifting the frame 15 up, until the pedal assumes the position shown in Fig. 1 whereupon the foot pedal and links 27, 28 lock the support in the raised position.

When the machine is to be raised, the lock is first broken by lifting the foot pedal whereupon the frame 15 falls down to the ground with the foot pedal standing vertical. Thereupon the person desiring to lift the machine may do so by pushing forward and down on the foot pedal which will bring the support to the position shown in dotted lines Fig. 1 and the links 18 to 20 will lock it in that position with the machine raised off the ground.

The frame 15 is locked in the raised position, see Fig. 1, by reason of the fact that the pivot adjoining the levers 27 and 25 passes below the line adjoining the pivot 24 and pivot at the other end of the lever 27, the stop 25' preventing the lever 25 from passing below the frame 15.

Having thus described our invention what we claim as new and desire to secure by Letters Patent of the United States, is as follows, express reservation being made of permissible modifications:

1. The combination, with a motorcycle, of a folding support, said support being pivoted to the frame at a lower portion thereof, a pair of jointed links connected with the support and a portion of the cycle frame to raise or lower the support, a foot pedal pivotally connected with the support adjacent the point at which it is secured to the motorcycle frame, and a link connecting said foot pedal and jointed links and forming a toggle connection between the foot pedal and jointed links whereby pressure on the foot pedal will raise the machine, the foot pedal being movable through an angle of nearly 180 degrees, and locking the support in the raised or lowered position.

2. The combination with a motorcycle of a folding support therefor pivotally connected with the lower portion of the motorcycle frame and adapted to be raised to a substantially horizontal position adjacent the rear wheel when not in use, a pair of jointed links connected with said support and the motorcycle frame, a foot lever, a link connecting the foot lever and one of the jointed links and forming a toggle connection between the foot pedal and jointed links to lock the support in the raised position, and a stop on which the foot lever rests when the support is raised.

3. The combination with a motor cycle, of a support therefor, said support being pivoted to the lower portion of the motor cycle frame and adapted to be raised to a horizontal position adjacent the rear wheel, a pair of jointed links connected with the rear of the support and the motorcycle frame, a foot pedal pivotally connected with the support adjacent its pivot point and capable of moving through an angle of almost 180 degrees, a link connected with the foot lever and jointed links, and forming a toggle connection between the foot pedal and jointed links of such length as to bring said jointed links into line with each other when the support is lowered, and a stop on the support against which the foot lever rests when the support is raised.

In testimony whereof we have hereunto set our hands.

GEORGE BETTS.
EARL C. COREY.

Witnesses:
C. S. HANNUM,
JOHN ROTH.

Copies of this patent may be obtained for five cents each, by addressing the "Commissioner of Patents, Washington, D. C."